United States Patent
Wang

(10) Patent No.: US 9,444,927 B2
(45) Date of Patent: *Sep. 13, 2016

(54) METHODS FOR VOICE MANAGEMENT, AND RELATED DEVICES

(71) Applicant: Hooloop Corporation, Taipei (TW)

(72) Inventor: John C. Wang, Taoyuan (TW)

(73) Assignee: HOOLOOP CORPORATION, Taipei (TW)

( * ) Notice: Subject to any disclaimer, the term of this patent is extended or adjusted under 35 U.S.C. 154(b) by 1 day.

This patent is subject to a terminal disclaimer.

(21) Appl. No.: 14/488,427

(22) Filed: Sep. 17, 2014

(65) Prior Publication Data

US 2015/0119004 A1    Apr. 30, 2015

(30) Foreign Application Priority Data

Oct. 24, 2013  (TW) .............................. 102138391 A

(51) Int. Cl.
| | |
|---|---|
| *H04M 1/725* | (2006.01) |
| *H04M 3/53* | (2006.01) |
| *H04M 3/533* | (2006.01) |
| *G10L 15/26* | (2006.01) |
| *G06F 3/16* | (2006.01) |

(52) U.S. Cl.
CPC .......... *H04M 1/72547* (2013.01); *G06F 3/167* (2013.01); *G10L 15/26* (2013.01); *H04M 3/533* (2013.01); *H04M 3/5322* (2013.01); *G06F 2203/0381* (2013.01)

(58) Field of Classification Search
CPC ......... H04M 1/72547; H04M 3/5322; H04M 3/533; G06F 17/214; G06F 17/24; G06F 17/30011; G06F 3/0483; G06F 3/0346; G06F 3/165; G06Q 20/123; G10L 15/26; G10L 15/265; G05B 15/02
See application file for complete search history.

(56) References Cited

U.S. PATENT DOCUMENTS

| | | | | |
|---|---|---|---|---|
| 8,326,328 | B2 * | 12/2012 | LeBeau | G10L 15/265 455/404.1 |
| 8,983,843 | B2 * | 3/2015 | Yoneyama | G01S 11/14 704/270 |
| 2009/0164219 | A1 * | 6/2009 | Yeung | G04C 3/002 704/258 |
| 2009/0177617 | A1 * | 7/2009 | Lee | H04L 12/58 |
| 2012/0265535 | A1 * | 10/2012 | Bryant-Rich | H04M 1/7255 704/270 |
| 2013/0013315 | A1 * | 1/2013 | Burke | G06F 3/0346 704/270 |
| 2013/0198397 | A1 * | 8/2013 | Zhang | H04W 4/001 709/228 |
| 2013/0297308 | A1 * | 11/2013 | Koo | G06F 3/167 704/235 |
| 2015/0249733 | A1 * | 9/2015 | Miura | H04M 1/72563 455/566 |
| 2015/0341481 | A1 * | 11/2015 | Kim | G10L 15/26 455/414.1 |

FOREIGN PATENT DOCUMENTS

| | | |
|---|---|---|
| CN | 101414984 A | 4/2009 |
| CN | 202563894 U | 11/2012 |
| TW | M296651 | 9/2006 |
| TW | M443221 | 12/2012 |

* cited by examiner

*Primary Examiner* — Hirdepal Singh
(74) *Attorney, Agent, or Firm* — McClure, Qualey & Rodack, LLP

(57) ABSTRACT

Methods for voice management, and related devices are provided. First, data is detected by a proximity sensor, and data is detected by an attitude sensor. Then, it is determined whether a sound is received by a voice reception unit. It is determined whether to perform a voice recording process or a voice playback process according to the data detected by the proximity sensor, the data detected by the attitude sensor, and whether a sound is received by the voice reception unit.

6 Claims, 8 Drawing Sheets

METHODS FOR VOICE MANAGEMENT, AND RELATED DEVICES

BACKGROUND OF THE INVENTION

1. Field of the Invention

The disclosure relates generally to methods for voice management, and, more particularly to methods that can automatically perform voice processes, such as voice recording process or voice playback process according to data detected by sensors, and related devices.

2. Description of the Related Art

Recently, portable devices, such as smart phones or notebooks, have become more and more technically advanced and multifunctional. For example, a portable device may have network connecting capabilities. Users can use their portable devices to connect to networks anytime and anywhere, browse the Internet, and perform related applications and services via the networks. Due to increased convenience and expanded functionalities of the devices, these devices have become necessities of life.

As a result of the popularity of applications for network communication in smartphones, communicating with friends online via smartphone applications has become a prevalent interaction method. Generally, users can input a text message or record a voice, and send the text message or the voice message to a specific friend or members of a group. The specific friend or the group members can read the text message or the voice message, immediately or at their leisure.

Conventionally, users must manually operate related application interfaces and select related functions to perform voice management processes, such as the voice recording process and the voice playback process. For typical users, the above operation is inconvenient and inefficient. When the operation for voice management needs to be frequently performed, the inconvenient and complicated nature of the operation becomes burdensome for the user and results in wasted system resources of electronic devices.

BRIEF SUMMARY OF THE INVENTION

Methods for voice management, and related devices are provided, wherein electronic devices can automatically perform voice processes, such as voice recording process or voice playback process according to data detected by sensors.

In an embodiment of a method for voice management, data is detected by a proximity sensor, and data is detected by an attitude sensor. Then, it is determined whether a sound is received by a voice reception unit. It is determined whether to perform a voice recording process or a voice playback process according to the data detected by the proximity sensor, the data detected by the attitude sensor, and whether a sound is received by the voice reception unit.

An embodiment of a device for voice management at least comprises a proximity sensor, an attitude sensor, a voice reception unit, and a processing unit. The processing unit determines whether to perform a voice recording process or a voice playback process according to data detected by the proximity sensor, data detected by the attitude sensor, and whether a sound is received by the voice reception unit.

In some embodiments, when the data detected by the proximity sensor indicates no object is present, the voice recording process or the voice playback process is terminated.

In some embodiments, the determination of whether a sound is received by the voice reception unit is performed by determining whether a volume of a sound received in a predefined time interval is greater than a specific value.

In some embodiments, when the data detected by the proximity sensor indicates an object is present, the data detected by the attitude sensor indicates a specific attitude, and no sound is received by the voice reception unit, the voice playback process is performed.

In some embodiments, it is determined whether at least one voice message which has not been played yet exists in the electronic device. When at least one voice message which has not been played yet exists in the electronic device, the voice playback process is performed.

In some embodiments, at least one voice message which has not been played yet is sequentially played in the voice playback process. In some embodiments, a command is generated according to the data detected by the attitude sensor in the voice playback process to determine which one of at least one voice message to be played. In some embodiments, when the data detected by the attitude sensor indicates a first attitude, a specific voice message which is currently played is stopped, and a voice message prior to the specific voice message in time sequence is played. When the data detected by the attitude sensor indicates a second attitude, a specific voice message which is currently played is stopped, and a voice message subsequent to the specific voice message in time sequence is played.

In some embodiments, after at least one voice message which has not been played yet is played, a notification is transmitted to a server to indicate that the voice message has been played by the electronic device.

In some embodiments, when the data detected by the proximity sensor indicates an object is present, the data detected by the attitude sensor indicates a specific attitude, and a sound is received by the voice reception unit, the voice recording process is performed.

In some embodiments, a voice message generated in the voice recording process is transmitted to a server, and the server notifies at least one participating electronic device of a group about the voice message corresponding to the electronic device. In some embodiments, an interface is further provided to display a playback status regarding the voice message generated in the voice recording process, in the at least one participating electronic device of the group.

In some embodiments, an interface is further provided to display an indication for at least one voice message which has been played or has not been played yet corresponding to the electronic device or at least one participating electronic device in a group.

In some embodiments, a voice message generated in the voice recording process is transformed into a text message, and the text message is transmitted to a server, and the server notifies at least one participating electronic device in a group about the text message corresponding to the electronic device.

In some embodiments, at least one text message received from at least one participating electronic device in a group is transformed into a voice message, and the voice message corresponding to the text message is played in the voice playback process.

In an embodiment of a method for voice management, a voice recording process is performed. It is determined whether a voice-to-text instruction is received. When the voice-to-text instruction is received, a voice message generated in the voice recording process is transformed into a text message. Then, the voice message or the text message is transmitted to a server, and the server notifies at least one participating electronic device in a group about the voice message or the text message corresponding to the electronic device.

The methods for voice management and related devices can automatically perform voice processes, such as voice recording process or voice playback process according to data detected by sensors, thereby increasing efficiency of voice management.

Methods for voice management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods for voice management, and related devices are provided.

Figure 1:
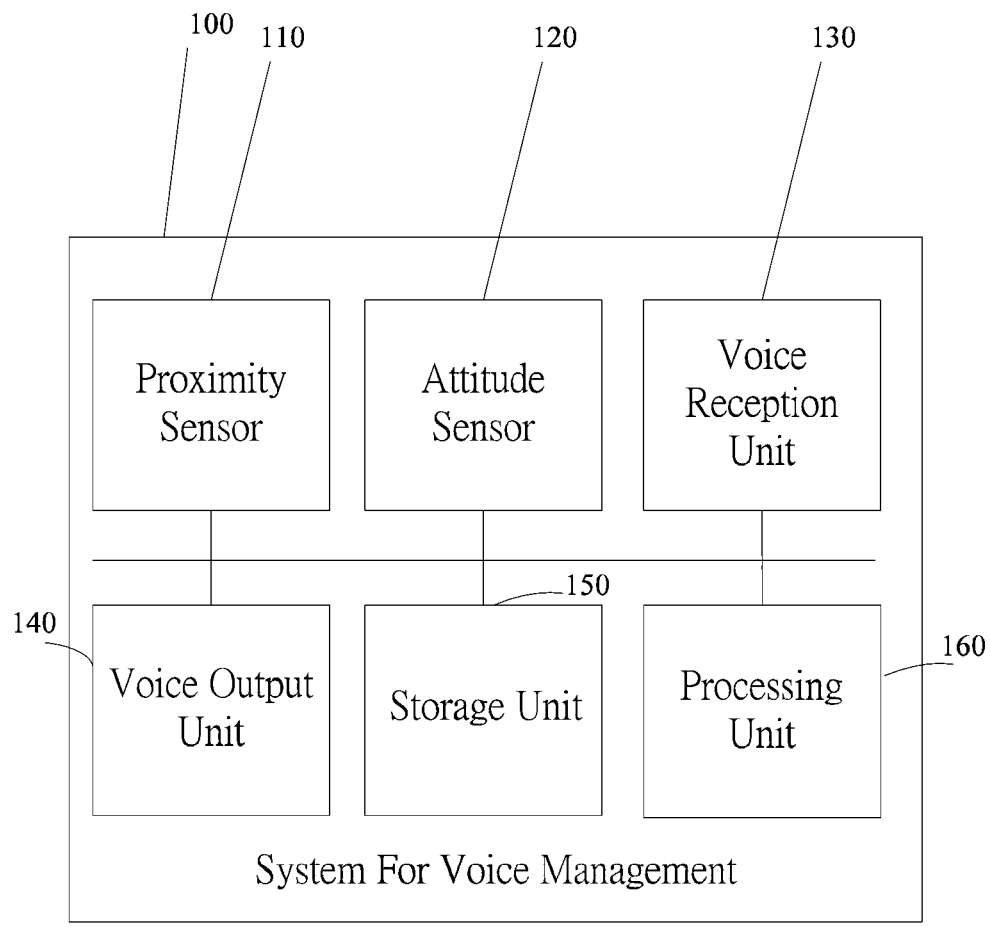
FIG. 1 is a schematic diagram illustrating an embodiment of a system for voice management of the invention.

FIG. 1 is a schematic diagram illustrating an embodiment of a system for voice management of the invention. As shown in FIG. 1, the system for voice management 100 can be used in an electronic device. In some embodiments, the electronic device may be any electronic device having network connecting capabilities, such as a computer, or a mobile device, such as a mobile phone, a smart phone, a PDA (Personal Digital Assistant), a GPS (Global Positioning System), or a notebook. The system for voice management 100 can comprise a proximity sensor 110, an attitude sensor 120, a voice reception unit 130 such as a microphone, a voice output unit 140 such as an earphone or a speaker, a storage unit 150, and a processing unit 160. It is understood that, in some embodiments, the system for voice management 100 can comprise a network connecting unit (not shown in FIG. 1), for connecting to a network, such as a wired network, a telecommunication network, and/or a wireless network. The electronic device can have network connecting capabilities by using the network connecting unit.

In some embodiments, the proximity sensor 110 can be set at a position nearby the voice output unit 140 to detect a presence of an object. That is the proximity sensor 110 can determine whether an object approaches the electronic device. The attitude sensor 120 may be an accelerometer and/or a Gyro sensor, which can detect an attitude, such as altitude and angle of the electronic device. The storage unit 150 can store related data, such as voice messages recorded by the electronic device and voice messages received from a server. The processing unit 160 can control related operations of hardware and software in the electronic device. It is understood that, in some embodiments, the system for voice management 100 can comprise a display unit (not shown in FIG. 1), which can display related information, such as images, interfaces, and/or data.

Figure 2:
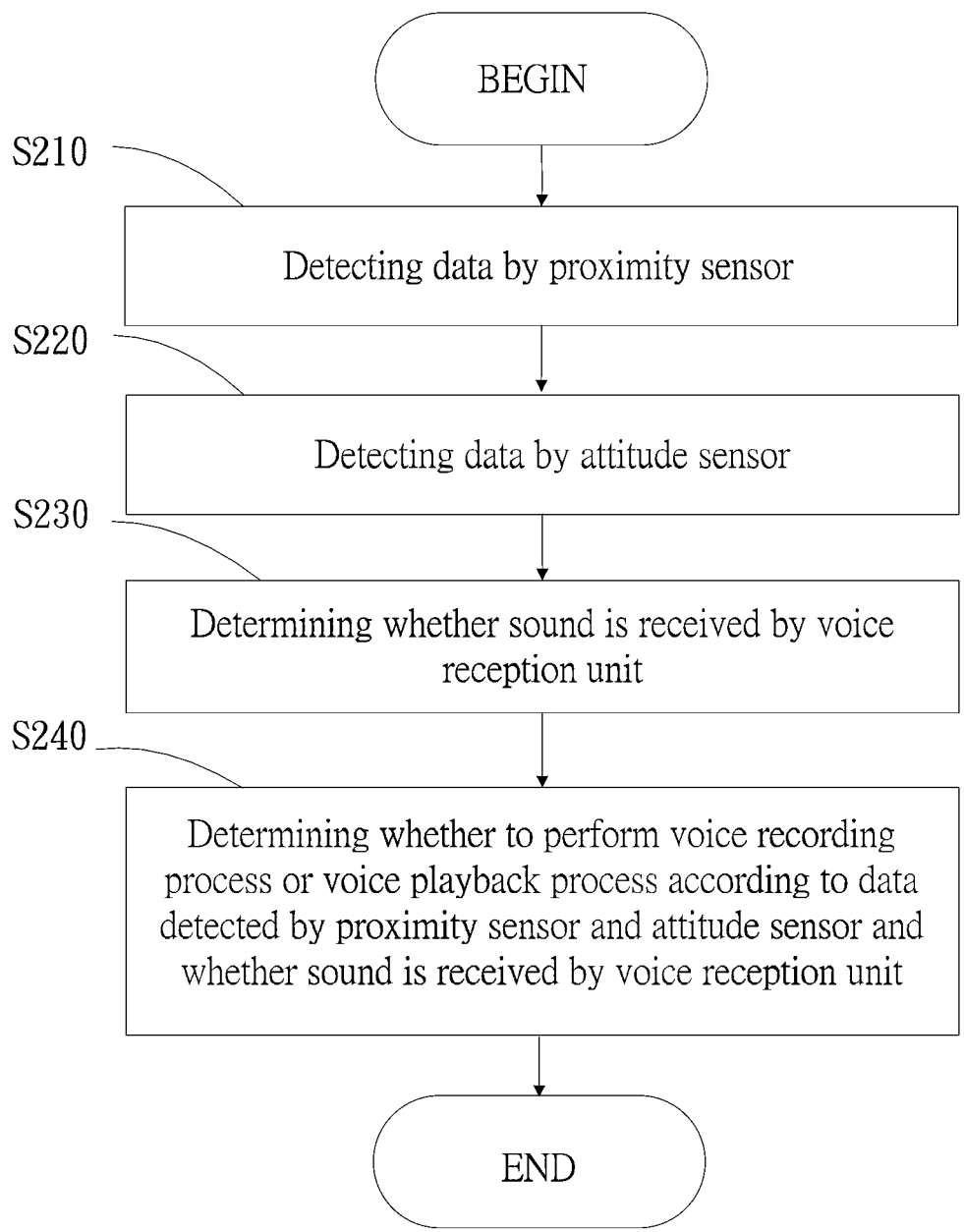
FIG. 2 is a flowchart of an embodiment of a method for voice management of the invention.

FIG. 2 is a flowchart of an embodiment of a method for voice management of the invention. The method for voice management can be used in an electronic device, such as a computer, or a mobile device, such as a mobile phone, a smartphone, a PDA, a GPS, or a notebook.

In step S210, data is detected by a proximity sensor, and in step S220, data is detected by an attitude sensor. In some embodiments, the proximity sensor can be set at a position nearby a voice output unit of the electronic device to detect a presence of an object. In some embodiments, the attitude sensor may be an accelerometer and/or a Gyro sensor, which can detect an attitude, such as altitude and angle of the electronic device. Then, in step S230, it is determined whether a sound is received by a voice reception unit. In step S240, it is determined whether to perform a voice recording process or a voice playback process according to the data detected by the proximity sensor, the data detected by the attitude sensor, and whether a sound is received by the voice reception unit. It is understood that, in some embodiments, the determination of whether a sound is received by the voice reception unit is performed by determining whether a volume of a sound received in a predefined time interval is greater than a specific value. It is noted that, the voice recording process and the voice playback process are discussed later.

Figure 3:
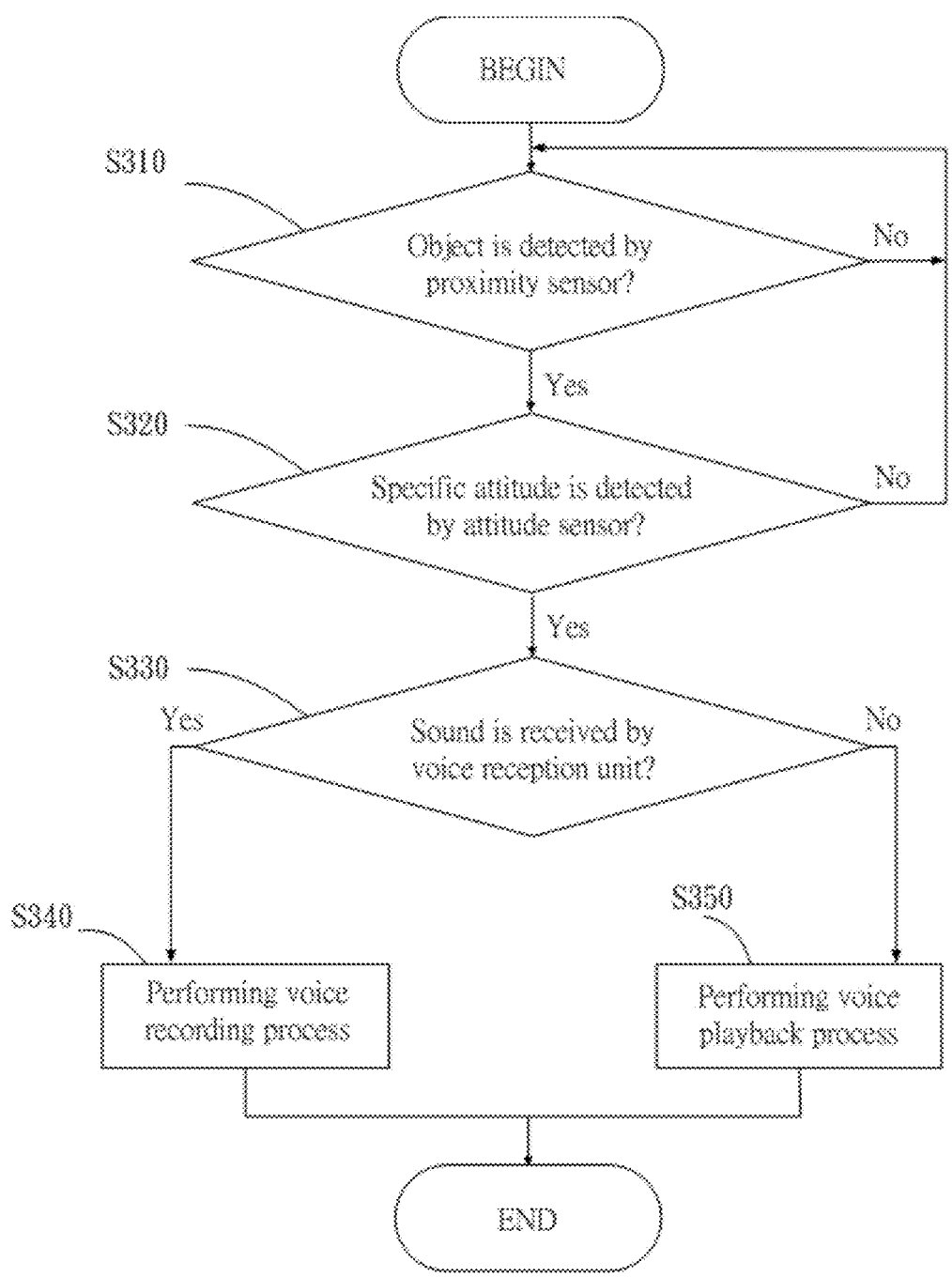
FIG. 3 is a flowchart of another embodiment of a method for voice management of the invention.

FIG. 3 is a flowchart of another embodiment of a method for voice management of the invention. The method for voice management can be used in an electronic device, such as a computer, or a mobile device, such as a mobile phone, a smart phone, a PDA, a GPS, or a notebook.

In step S310, it is determined whether an object is detected by a proximity sensor. Similarly, the proximity sensor can be set at a position nearby a voice output unit of the electronic device to detect a presence of an object. If no object is detected by the proximity sensor (No in step S310), the procedure remains at step S310. If an object is detected by the proximity sensor (Yes in step S310), in step S320, it is determined whether an attitude detected by an attitude sensor indicates a specific attitude, such as a pose indicating a user substantially putting an electronic device nearby the ear. Similarly, in some embodiments, the attitude sensor may be an accelerometer and/or a Gyro sensor, which can detect an attitude, such as altitude and angle of the electronic device. If the attitude detected by the attitude sensor does not indicate a specific attitude (No in step S320), the procedure returns to step S310. If the attitude detected by the attitude sensor indicates a specific attitude (Yes in step S320), in step S330, it is determined whether a sound is received by a voice reception unit. Similarly, the determination of whether a sound is received by the voice reception unit is performed by determining whether a volume of a sound received in a predefined time interval is greater than a specific value. If a sound is received by the voice reception unit (Yes in step S330), in step S340, a voice recording process is performed. If no sound is received by the voice reception unit (No in step S330), in step S350, a voice playback process is performed. It is noted that, the voice recording process and the voice playback process are discussed later.

Figure 4:
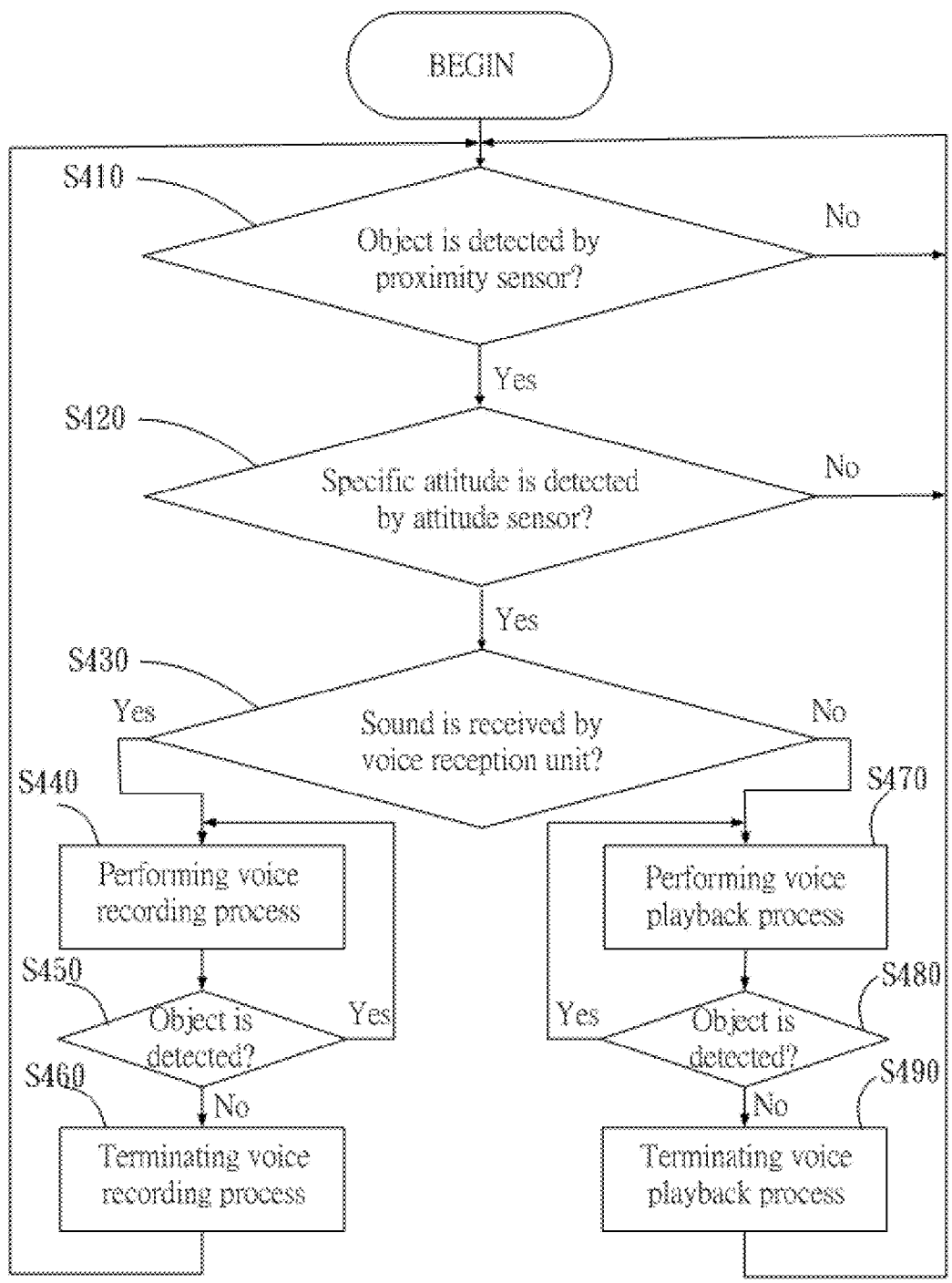
FIG. 4 is a flowchart of another embodiment of a method for voice management of the invention.

FIG. 4 is a flowchart of another embodiment of a method for voice management of the invention. The method for voice management can be used in an electronic device, such as a computer, or a mobile device, such as a mobile phone, a smart phone, a PDA, a GPS, or a notebook. In the embodiment, the data detected by the proximity sensor can be used to determine whether to terminate the voice management operations.

In step S410, it is determined whether an object is detected by a proximity sensor. Similarly, the proximity sensor can be set at a position nearby a voice output unit of the electronic device to detect a presence of an object. If no object is detected by the proximity sensor (No in step S410), the procedure remains at step S410. If an object is detected by the proximity sensor (Yes in step S410), in step S420, it is determined whether an attitude detected by an attitude sensor indicates a specific attitude, such as a pose indicating that a user substantially putting an electronic device nearby the ear. Similarly, in some embodiments, the attitude sensor may be an accelerometer and/or a Gyro sensor, which can detect an attitude, such as altitude and angle of the electronic device. If the attitude detected by the attitude sensor does not indicate a specific attitude (No in step S420), the procedure returns to step S410. If the attitude detected by the attitude sensor indicates a specific attitude (Yes in step S420), in step S430, it is determined whether a sound is received by a voice reception unit. Similarly, the determination of whether a sound is received by the voice reception unit is performed by determining whether a volume of a sound received in a predefined time interval is greater than a specific value. If a sound is received by the voice reception unit (Yes in step S430), in step S440, a voice recording process is performed. During the voice recording process, in step S450, it is determined whether an object is detected by the proximity sensor. If the object is still detected by the proximity sensor (Yes in step S450), the voice recording process is continuously performed. If the object is not detected by the proximity sensor (No in step S450), in step S460, the voice recording process is terminated, and the procedure returns to step S410. If no sound is received by the voice reception unit (No in step S430), in step S470, a voice playback process is performed. During the voice playback process, in step S480, it is determined whether an object is detected by the proximity sensor. If the object is still detected by the proximity sensor (Yes in step S480), the voice playback process is continuously performed. If the object is not detected by the proximity sensor (No in step S480), in step S490, the voice playback process is terminated, and the procedure returns to step S410. Similarly, the voice recording process and the voice playback process are discussed later.

Figure 5:
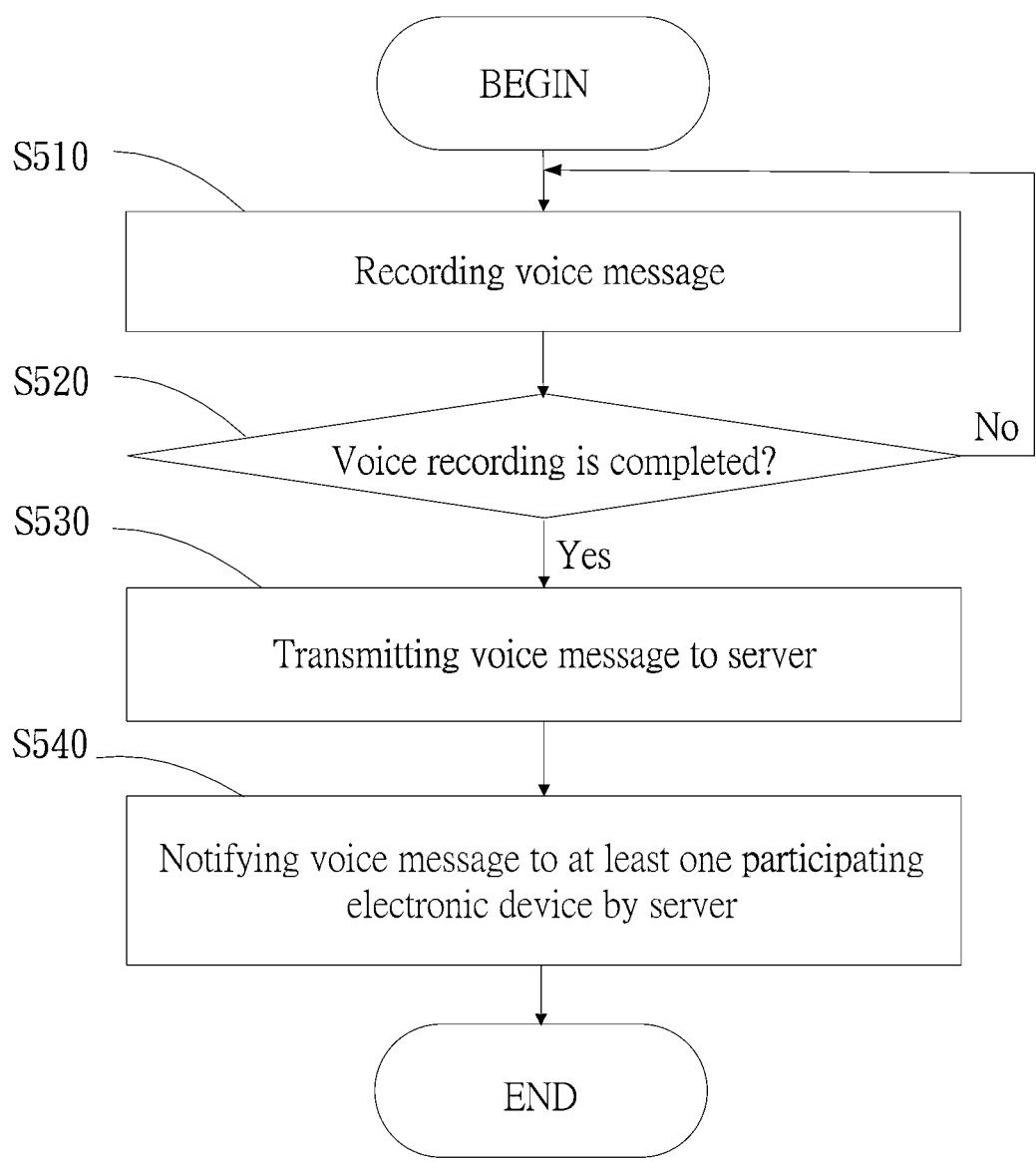
FIG. 5 is a flowchart of an embodiment of a method for voice recording process of the invention.

FIG. 5 is a flowchart of another embodiment of a method for voice recording process of the invention. The method for voice recording process can be used in an electronic device, such as a computer, or a mobile device, such as a mobile phone, a smart phone, a PDA, a GPS, or a notebook.

When an object is detected by a proximity sensor, an attitude of the electronic device detected by an attitude sensor indicates a specific attitude, such as a pose indicating that a user substantially putting an electronic device nearby the ear, and a sound is received by a voice reception unit, in step S510, a voice recording process is performed according to the sound received by the voice reception unit to generate a voice message. Then, in step S520, it is determined whether an instruction corresponding to the termination of the voice recording process is received. It is understood that, in some embodiments, during the voice recording process, an instruction corresponding to the termination of the voice recording process can be generated when no object is detected by the proximity sensor. If no instruction corresponding to the termination of the voice recording process is received (No in step S520), the procedure returns to step S510. If an instruction corresponding to the termination of the voice recording process is received (Yes in step S520), in step S530, the voice message generated in the voice recording process is transmitted to a server. In step S540, the server notifies at least one participating electronic device of a group about the voice message. It is understood that, in some embodiments, the server can notify at least one participating electronic device of a group about the voice message has been generated. It is understood that, in some embodiments, the voice recording process may be performed for a project and/or a conference call of a group having at least one member. Respective members can have their own electronic devices to perform related voice management processes.

It is understood that, in some embodiments, before the voice message is transmitted to the server, the electronic device can first transform the voice message generated in the voice recording process into a text message, and transmit the text message to the server. It is noted that, in some embodiments, a block or a diagram corresponding to the recorded voice message can be displayed in a display interface. When a user wants to transform the voice message into a text message, the user can use the finger to slide on the block or the diagram via a touch-sensitive display unit. During the slide, an animation can be displayed, such that the user is informed of the fact that the process of transformation from a voice message to a text message is currently performed. Similarly, the server can notify at least one participating electronic device of a group about the text message.

Figure 6:
FIG. 6 is a schematic diagram illustrating an embodiment of a display interface of the invention.
Figure 6:
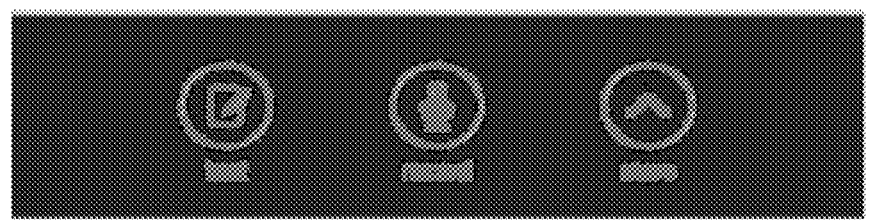

It is understood that, in some embodiments, the electronic device can display an interface via a display unit, wherein the interface can be used to display an indication for at least one voice message which has been played or has not been played yet corresponding to the electronic device or at least one participating electronic device in a group. In some embodiments, after the voice message is generated by the electronic device, the interface can also display a playback status regarding the voice message, in the at least one participating electronic device of the group. In an example of a group with 6 participating electronic devices, when a voice message has not been played by any of the participating electronic devices, the playback status regarding the voice message can be marked as 6. When a participating electronic device plays the voice message, the playback status regarding the voice message can be subtracted by 1. In another example of a group with 6 participating electronic devices, when a voice message has not been played by any participating electronic devices, the playback status regarding the voice message can be marked as 0. When a participating electronic device plays the voice message, the playback status regarding the voice message can be added by 1. For example, a display unit of an electronic device can display an embodiment of a display interface 600 of the present invention. The display interface 600 displays voice message indications corresponding to a group of project A. As shown in FIG. 6, the voice message indications of project A comprises a voice message 610 generated by Albert and a voice message 620 generated by John. It is noted that, in the example, John is a user of the electronic device, and the generated voice message has a corresponding playback status 621. As described, the playback status corresponding to the voice message can be changed depending on the playback status regarding the voice message in the respective participating electronic device of project A.

Figure 7:
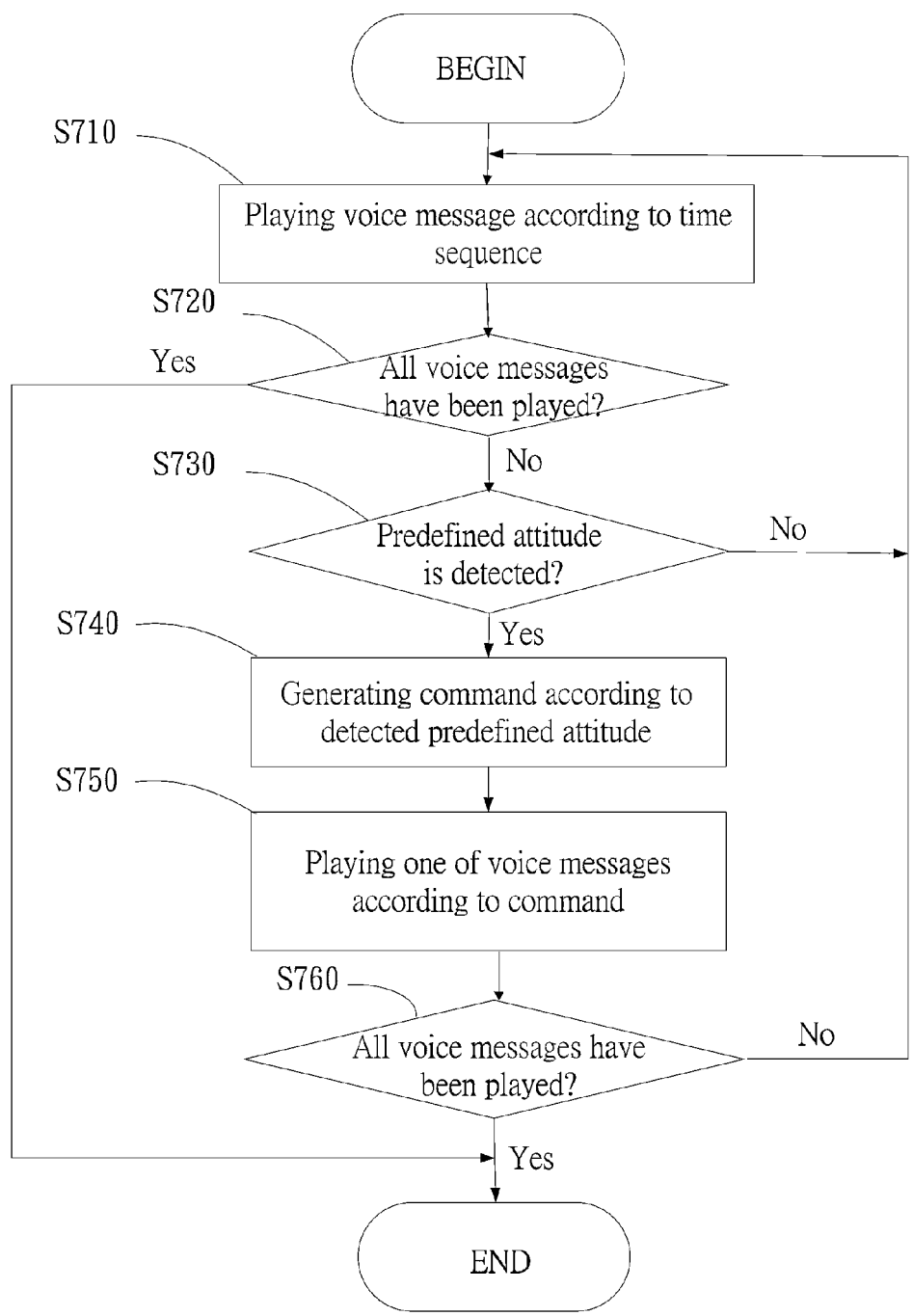
FIG. 7 is a flowchart of an embodiment of a method for voice playback process of the invention.

FIG. 7 is a flowchart of another embodiment of a method for voice playback process of the invention. The method for voice playback process can be used in an electronic device, such as a computer, or a mobile device, such as a mobile phone, a smart phone, a PDA, a GPS, or a notebook.

When an object is detected by a proximity sensor, an attitude of the electronic device detected by an attitude sensor indicates a specific attitude, such as a pose indicating that a user substantially putting an electronic device nearby the ear, and no sound is received by a voice reception unit, in step S710, at least one voice message which has not been played yet is sequentially played. It is understood that, in some embodiments, it is determined whether the electronic device has at least one voice message which has not been played yet in the group before step S710. If the electronic device has at least one voice message which has not been played yet in the group, the voice message playback process in step S710 is performed. In step S720, it is determined whether all of at least one voice message which has not been played yet has been played. If all of at least one voice message which has not been played yet has been played (Yes in step S720), the procedure is completed. If not all of at least one voice message which has not been played yet has been played (No in step S720), in step S730, it is determined whether at least one predefined attitude is detected by the attitude sensor. It is understood that, the predefined attitude can be set according to different applications and requirements. In some embodiments, the predefined attitude may differ by a predefined angle from the above specific attitude. If no predefined attitude is detected by the attitude sensor (No in step S730), the procedure returns to step S710. If the predefined attitude is detected by the attitude sensor (Yes in step S730), in step S740, a command is generated according to the data (predefined attitude) detected by the attitude sensor, and in step S750, one of at least one voice message is determined to be played. For example, in some embodiments, when the data detected by the attitude sensor indicates a first attitude, a specific voice message which is currently played is stopped, and a voice message prior to the specific voice message in time sequence is played. When the data detected by the attitude sensor indicates a second attitude, a specific voice message which is currently played is stopped, and a voice message subsequent to the specific voice message in time sequence is played. Then, in step S760, it is determined whether all of at least one voice message which has not been played yet has been played. If all of at least one voice message which has not been played yet has been played (Yes in step S760), the procedure is completed. If not all of at least one voice message which has not been played yet has been played (No in step S760), the procedure returns to step S710.

It is understood that, in some embodiments, after at least one voice message which has not been played yet is played, the electronic device can transmit a notification to a server to indicate that the voice message has been played by the electronic device. As described, when the server receives the notification, the playback status displayed in the electronic device generating the voice can be accordingly changed.

Figure 8:
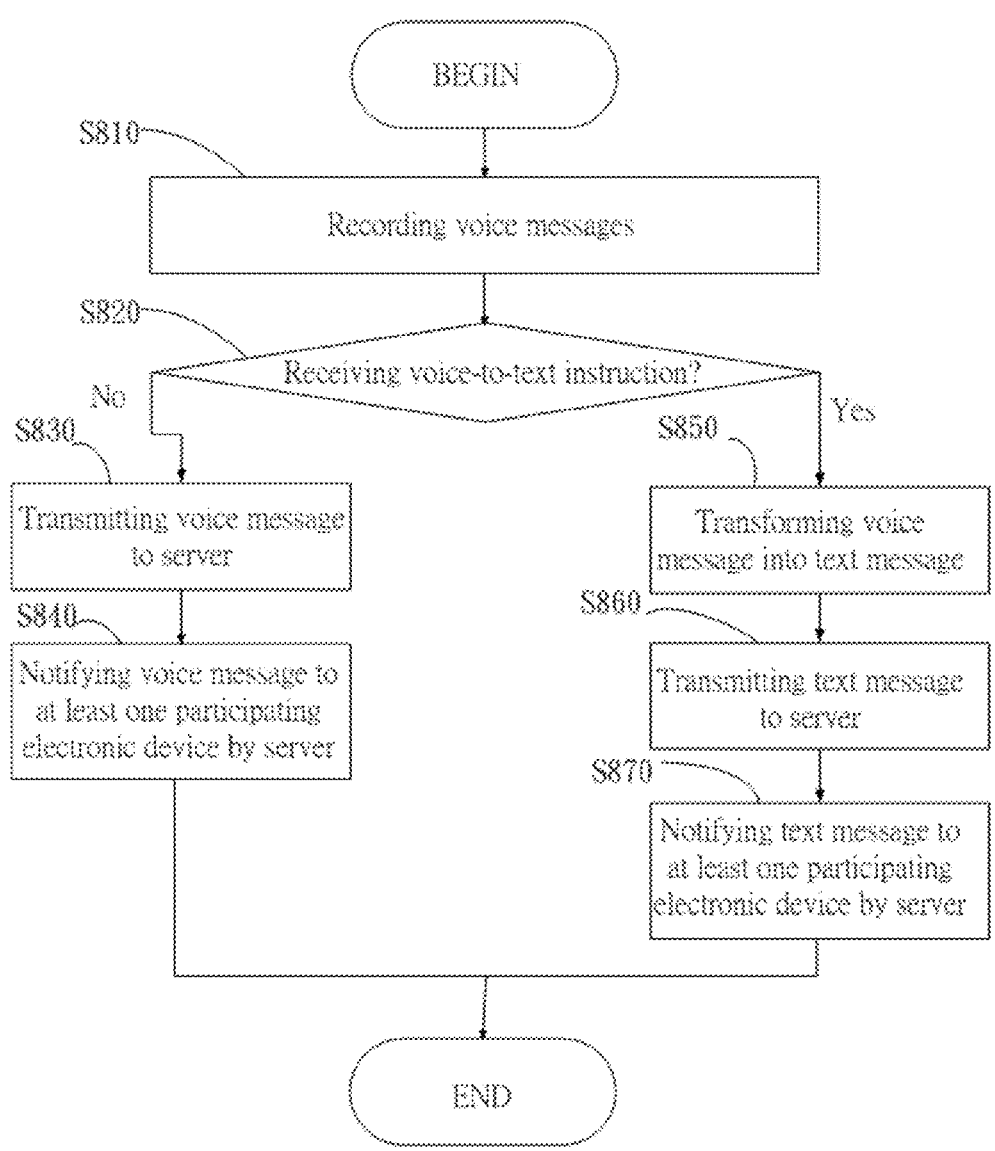
FIG. 8 is a flowchart of another embodiment of a method for voice management of the invention.

FIG. 8 is a flowchart of another embodiment of a method for voice management of the invention. The method for voice management can be used in an electronic device, such as a computer, or a mobile device, such as a mobile phone, a smart phone, a PDA, a GPS, or a notebook. In the embodiment, a voice message generated in a voice recording process can be selectively transformed into a text message to be transmitted to a server.

In step S810, a voice recording process is performed to generate a voice message. It is understood that, in some embodiments, when an object is detected by a proximity sensor, an attitude of the electronic device detected by an attitude sensor indicates a specific attitude, such as a pose indicating that a user substantially putting an electronic device nearby the ear, and a sound is received by a voice reception unit, a voice recording process is performed according to the sound received by the voice reception unit to generate a voice message. In some embodiments, users can press a physical or virtual button of the electronic device to directly perform a voice recording process via the voice reception unit to generate a voice message. Then, in step S820, it is determined whether a voice-to-text instruction is received. It is noted that, in some embodiments, a block or a diagram corresponding to the recorded voice can be displayed in a display interface. When a user wants to transform the voice message into a text message, the user can use the finger to slide on the block or the diagram via a touch-sensitive display unit. The slide may be defined as the voice-to-text instruction. During the slide, an animation can be displayed, such that the user is informed of the fact that the process of transformation from a voice message to a text message is currently performed. If no voice-to-text instruction is received (No in step S820), in step S830, the voice message generated in the voice recording process is transmitted to a server, and in step S840, the server notifies at least one participating electronic device in a group about the voice message. It is understood that, in some embodiments, the voice recording process may be performed for a project and/or a conference call of a group having at least one member. Respective members can have their own electronic devices to perform related voice management processes. If a voice-to-text instruction is received (Yes in step S820), in step S850, a voice message generated in the voice recording process is transformed into a text message. Then, in step S860, the text message is transmitted to a server, and in step S870, the server notifies at least one participating electronic device in a group about the text message.

It is understood that, in some embodiments, regardless of whether the voice messages or text messages generated by other electronic devices in the group are received by the participating electronic device, the received information, such as the voice messages and the text messages can be seen or heard. In some embodiments, when a voice message is received by a participating electronic device, the participating electronic device can use a voice-to-text technology to transform the voice message into a text message, and display the text message. It is noted that, in some embodiments, part or all of the text message can be displayed in the user interface. In some embodiments, when a text message is received by a participating electronic device, the participating electronic device can use a text-to-voice technology to transform the text message into a voice message, and marks an indication nearby the text message to indicate that a transformed voice message is provided for the text message. When a user of the participating electronic device wants to listen to the voice messages or text messages in the participating electronic device, the user can follow the embodiment in FIG. 7 to play the voice messages. It is noted that, since the respective text message has a corresponding transformed voice, the transformed voice corresponding to the respective text message will also be played. Consequently, the user does not need to repeatedly move the electronic device to listen the voice messages or to view the text messages. On the other hand, when a user of the participating electronic device wants to view the voice messages or text messages in the participating electronic device, the user can directly and efficiently view the information generated by other electronic devices in the group since the respective voice message has corresponding transform text messages.

Therefore, the methods for voice management, and related devices of the present invention can automatically perform voice processes, such as voice recording process or voice playback process according to data detected by a proximity sensor and an attitude sensor, thereby increasing efficiency of voice management, and reducing waste of system resources of the electronic device. As a result, the user just puts the device next to her ear and the message play. If the user wishes to speak, the user just lifts up the device to speak and the device records. The experience involves no button pushing. The natural human gesture is intuitive.

Methods for voice management may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for voice management for use in an electronic device, comprising:
   detecting data by a proximity sensor;
   detecting data by an attitude sensor;
   determining whether a sound is received by a voice reception unit;
   determining whether to perform a voice recording process or a voice playback process according to the data detected by the proximity sensor, the data detected by the attitude sensor, and whether a sound is received by the voice reception unit, wherein when the data detected by the proximity sensor indicates an object is present, the data detected by the attitude sensor indicates a specific attitude, and no sound is received by the voice reception unit, the voice playback process is performed; and
   generating a command according to the data detected by the attitude sensor in the voice playback process to determine one of at least one voice message to be played, wherein when the data detected by the attitude sensor indicates a first attitude, a specific voice message which is currently played is stopped, and a voice message prior to the specific voice message in time sequence is played, and when the data detected by the attitude sensor indicates a second attitude, the specific voice message which is currently played is stopped, and a voice message subsequent to the specific voice message in time sequence is played.

2. The method of claim 1, further comprising terminating the voice recording process or the voice playback process when the data detected by the proximity sensor indicates no object is present.

3. The method of claim 1, further comprising transforming a voice message generated in the voice recording process into a text message, and transmitting the text message to a server, wherein the server notifies at least one participating electronic device in a group about the text message corresponding to the electronic device.

4. The method of claim 1, further comprising transforming at least one text message received from at least one participating electronic device in a group into a voice message by the electronic device, and the voice message corresponding to the text message is played in the voice playback process.

5. A system for voice management for use in an electronic device, comprising:
   a proximity sensor;
   an attitude sensor;
   a voice reception unit; and
   a processing unit determining whether to perform a voice recording process or a voice playback process according to data detected by the proximity sensor, data detected by the attitude sensor, and whether a sound is received by the voice reception unit, in which when the data detected by the proximity sensor indicates an object is present, the data detected by the attitude sensor indicates a specific attitude, and no sound is received by the voice reception unit, the voice playback process is performed, and the processing unit generates a command according to the data detected by the attitude sensor in the voice playback process to determine one of at least one voice message to be played, wherein when the data detected by the attitude sensor indicates a first attitude, a specific voice message which is currently played is stopped, and a voice message prior to the specific voice message in time sequence is played, and when the data detected by the attitude sensor indicates a second attitude, the specific voice message which is currently played is stopped, and a voice message subsequent to the specific voice message in time sequence is played.

6. A non-transitory machine-readable storage medium comprising a computer program, which, when executed, causes a device to perform a method for voice management, wherein the method comprises:
   detecting data by a proximity sensor;
   detecting data by an attitude sensor;
   determining whether a sound is received by a voice reception unit;
   determining whether to perform a voice recording process or a voice playback process according to the data detected by the proximity sensor, the data detected by the attitude sensor, and whether a sound is received by the voice reception unit, wherein when the data detected by the proximity sensor indicates an object is present, the data detected by the attitude sensor indicates a specific attitude, and no sound is received by the voice reception unit, the voice playback process is performed; and generating a command according to the data detected by the attitude sensor in the voice playback process to determine one of at least one voice message to be played, wherein when the data detected by the attitude sensor indicates a first attitude, a specific voice message which is currently played is stopped, and a voice message prior to the specific voice message in time sequence is played, and when the data detected by the attitude sensor indicates a second attitude, the specific voice message which is currently played is stopped, and a voice message subsequent to the specific voice message in time sequence is played.

* * * * *